Feb. 28, 1928.
F. CESARIO
BRAKE FOR VEHICLES
Filed March 22, 1927
1,660,476
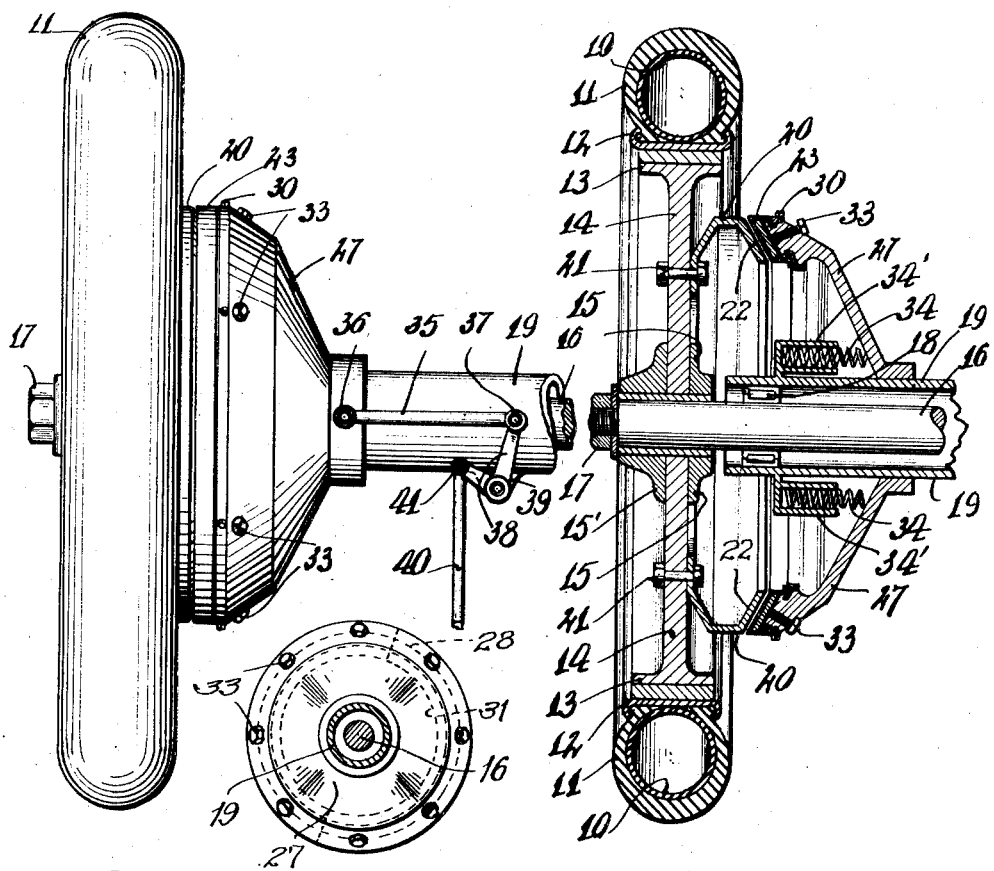
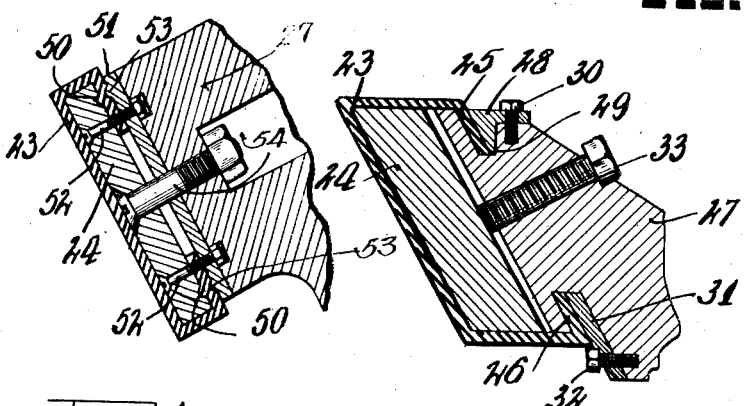
INVENTOR
Frank Cesario
BY
ATTORNEY Patented Feb. 28, 1928.

1,660,476

UNITED STATES PATENT OFFICE.

FRANK CESARIO, OF PORT CHESTER, NEW YORK.

BRAKE FOR VEHICLES.

Application filed March 22, 1927. Serial No. 177,434.

This invention relates to a new and useful device in the nature of a brake particularly adapted for use in connection with motor vehicles for the purpose of providing a means of stopping the said motor vehicles.

The object of the invention is to provide a brake for motor vehicles of novel construction and arrangement of parts, hereinafter more fully described, claimed, and illustrated in the accompanying drawing, in which:—

Fig. 1 shows a top plan view of my improved brake attached to a motor vehicle wheel.
Fig. 2 shows a central sectional view thereof.

Fig. 3 shows an enlarged sectional view of the method of attaching the brake lining, as embodied in my improved device.
Fig. 4 shows a similar view to that illustrated in Fig. 3, of a modification of the method of attaching the brake lining.

Fig. 5 is an end view of a brake shoe embodied in my invention.
The inner tube 10, the shoe 11, or tire, is mounted on the rim 12, which is attached to the felloe band 13, provided with the spokes 14, hub 15 and flange 15', and attached to the axle 16 by the nut 17. The axle 16, is rotatively mounted on the bearing 18, and on similar bearings, not shown in the accompanying drawing, supported by the axle housing 19, the above described elements being those of a motor vehicle of common construction and design, it being understood that I do not necessarily limit the use of my invention to the particular type of construction as above described, but to all types and classes of motor vehicles.
As here embodied my improved brake for motor vehicles comprises a brake drum 20, of hollow circular construction, attached, as at 21, by bolts, or the like, to the above mentioned spokes 14. The brake drum 20 is provided with an outer flanged element 22, bent or formed inwardly, at an angle thereto.

The brake lining 23, is formed over the circular ring member 24, and is provided with extended elements 25 and 26, which are bent or formed in elongated circumferential apertures in the shoe member 27. As a means of securely holding the brake lining 23, in the shoe member 27, I have provided an outer retaining ring 28, having a tapered edge 29, adapted to engage in the said elongated circumferential aperture in the shoe member 27. The outer retaining ring 28 is attached to the shoe member 27 by the screws 30. The brake lining 23, is also attached to the shoe member 27, by the inner retaining ring 31, adapted to engage in the said elongated circumferential aperture in the shoe member 27. The inner retaining ring 31 is attached to the shoe member 27 by screws 32.

As a means of securing the desired tension on the brake lining 24, I have provided screws 33, secured to the shoe member 27, and so positioned as to force the circular ring member 24 outwardly therefrom. It is understood that the inner and outer retaining members may be constructed in segments, so as to be easily applied to the shoe member 27.

The shoe member 27 is slidably mounted on the above mentioned axle housing 19, and is normally held in a disengaged position with the brake drum 20, by the expansion springs 34, positioned in hollow cylindrical members 34', attached to the axle housing 19.

The rod 35 is pivotally attached, as at 36, to the shoe member 27, and is similarly attached to one extremity of the bell crank 38. The bell crank 38 is pivotally attached to the bracket 39, supported by the axle housing. The rod 40, is pivotally attached, as at 41, to one extremity of the bell crank 38, and is similarly attached to the usual foot brake pedal, or brake lever, not shown on the accompanying drawing.

The above described construction is such as will permit the brake lining 23 to be engaged with the brake drum 20, when the above mentioned foot brake pedal is forced downward, or when the brake lever is pulled forward. It is understood that both rear wheels of the hereinbefore described motor vehicle are equipped with my improved brake.

In Fig. 4 of the accompanying drawing, the brake lining 23, is formed over the circular ring-shaped member 24, and is extended over the rear of the ring-shaped member 24, which is provided with circular concentric grooves 50, adapted to receive the brake lining 23. The intermediate ring-shaped member 51, is positioned at the rear of the ring-shaped member 24, and is attached thereto, by the threaded members 52, bolts, screws, or the like, which are also extended through the rear portion of the brake lining 23, as a means of attaching the brake lining 23 to the ring-shaped members 24 and 51. The intermediate ring-shaped member 51 is provided with extended concentric elements 53, positioned so as to force the brake lining 23, into the circular concentric grooves 50, so as to securely hold the brake lining 23 in place.

The ring-shaped members 24 and 51, and the brake lining 23, are attached by the threaded members 54, bolts, screws or the like, to the shoe member 27.

Having thus described my invention, what I claim as new and desire to protect by Letters Patent of the United States is as follows:—

1. A brake for motor vehicles comprising a brake shoe having inner and outer circular grooves in the edge portions thereof, a ring member positioned adjacent the edge of said shoe, a brake lining disposed over said ring member comprising inner and outer extended edge portions disposed in the inner and outer grooves of said brake shoe respectively, and inner and outer rings disposed in said inner and outer grooves of said brake shoe between the edge portions of said lining and one edge of said grooves for securing said lining on said brake shoe.

2. A brake for motor vehicles comprising a brake shoe having inner and outer circular grooves in the edge portions thereof, a ring member positioned adjacent the edge of said shoe, a brake lining disposed over said ring member comprising inner and outer extended edge portions disposed in the inner and outer grooves of said brake shoe respectively, inner and outer rings disposed in said inner and outer grooves of said brake shoe between the edge portions of said lining and one edge of said grooves for securing said lining on said brake shoe, and adjusting screws disposed through apertures in said brake shoe and engaged with said first mentioned ring member for suitably spacing the latter apart form said brake shoe to tension said brake lining.

3. A brake for vehicles comprising a brake drum mounted on a vehicle wheel, an inclined flange on said drum, a brake shoe comprising a conical drum having an edge surface inclined substantially parallel to the flange of said brake drum, said brake shoe being slidably mounted on the rear axle of said vehicle, an annular member disposed between the inclined edge of said brake shoe and said inclined flange, a brake lining disposed around said annular member and secured at it sedge portions to the edge portions of said brake shoe, and means comprising spaced apart bolts screw threaded through apertures in said brake shoe and engaged with said annular member for adjustably retaining said brake lining at a desired distance from the inclined flange of said brake drum and adapted to tension said brake lining.

In testimony whereof I have affixed my signature.

FRANK CESARIO.